Figure 4:
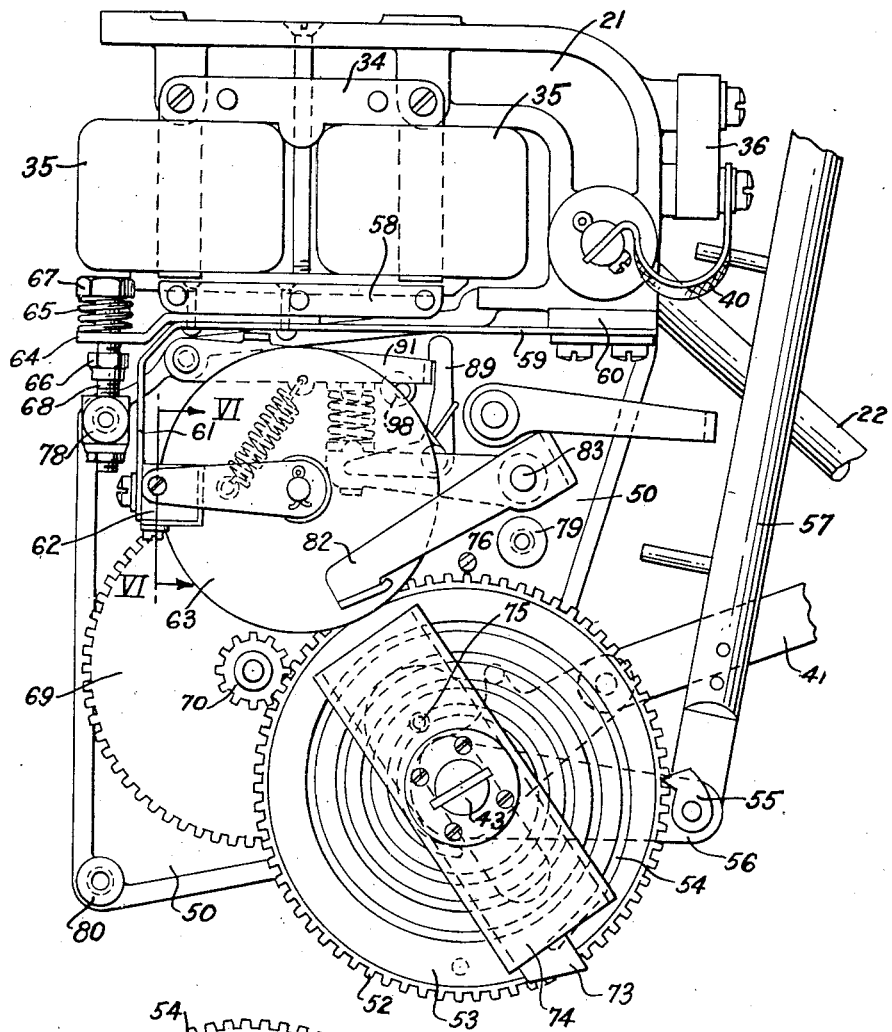

May 4, 1943.                J. S. THOMPSON                2,318,342
            AUTOMATIC SERVICE RESTORING CIRCUIT BREAKER
                    Filed Dec. 23, 1941         3 Sheets-Sheet 1
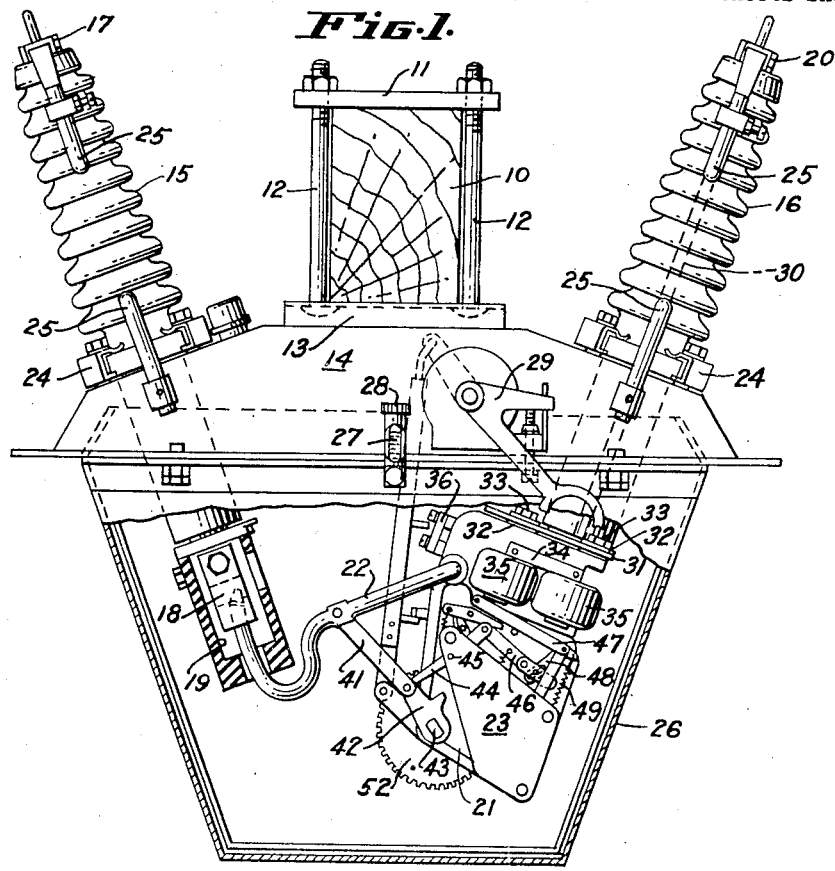
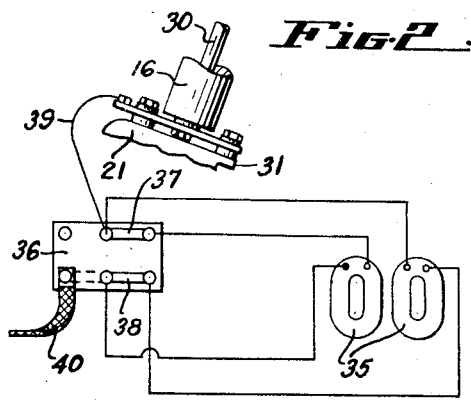
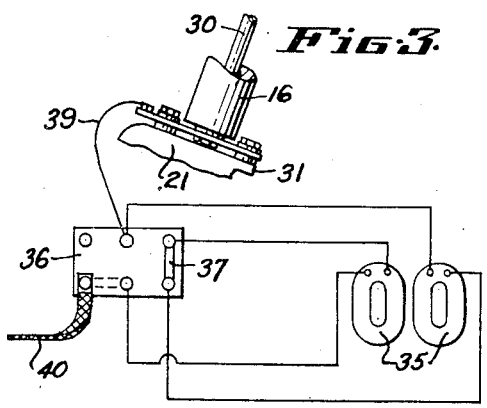
INVENTOR.
Joseph S. Thompson
BY
ATTORNEY.

May 4, 1943.  J. S. THOMPSON  2,318,342
AUTOMATIC SERVICE RESTORING CIRCUIT BREAKER
Filed Dec. 23, 1941  3 Sheets-Sheet 2

INVENTOR.
Joseph S. Thompson
BY
ATTORNEY

May 4, 1943.                J. S. THOMPSON                 2,318,342
              AUTOMATIC SERVICE RESTORING CIRCUIT BREAKER
                    Filed Dec. 23, 1941           3 Sheets-Sheet 3
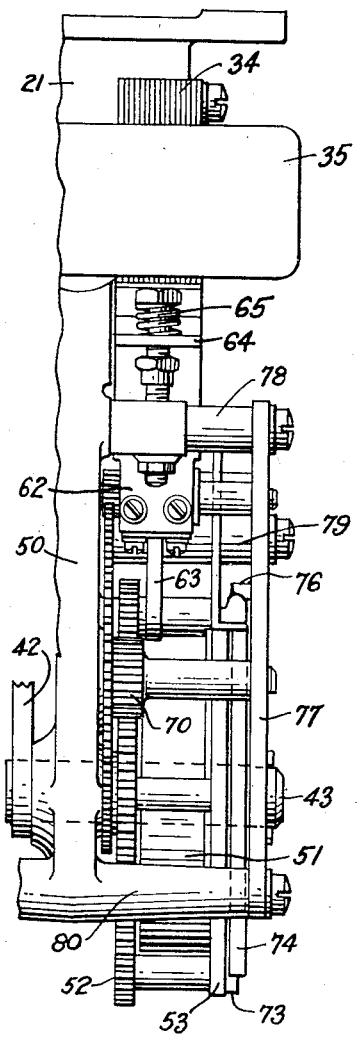
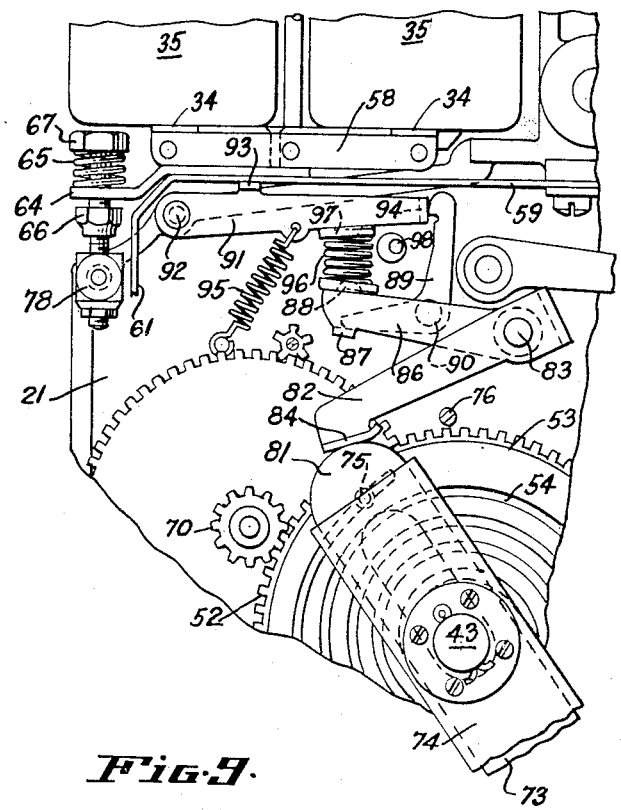
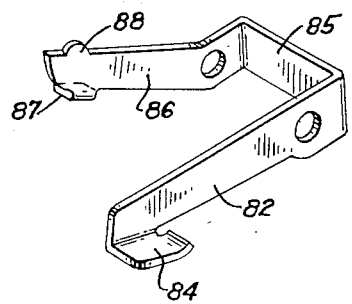
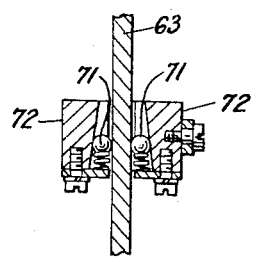
INVENTOR.
Joseph S. Thompson
BY
ATTORNEY Patented May 4, 1943

2,318,342

UNITED STATES PATENT OFFICE 2,318,342

AUTOMATIC SERVICE RESTORING CIRCUIT BREAKER

Joseph S. Thompson, Los Altos, Calif., assignor to Pacific Electric Manufacturing Corporation, San Francisco, Calif., a corporation of California Application December 23, 1941, Serial No. 424,147

16 Claims. (Cl. 200—89)

The present invention relates generally to service restoring circuit breakers suitable for use on rural power transmission lines to restore the line circuit in an automatic manner in the event of a temporary fault or overload upon the circuit, and more particularly it relates to an improved spring winding mechanism for spring operated service restorers of the type illustrated and described in my copending application Serial No. 413,175, dated October 1, 1941, and entitled Automatic reclosing circuit breaker.

An object of the invention is to provide an operating mechanism for a service restorer of the character designated that is simple in construction, reliable in its action, and fully automatic in its operation.

Another object of the invention is to provide an operating mechanism for an automatic service restorer in which an energy storing spring is maintained in a predetermined wound condition by motor means excited by the current passing through the service restorer.

Another object of the invention is to provide a novel winding mechanism for the operating spring of a circuit breaker of the character described in which an electric motor, associated with the controlled circuit, operates to maintain the operating spring in a wound condition.

Another object of the invention is to provide an operating mechanism for a service restorer of the character described in which an operating spring is wound and held in an operative condition by electromagnetic means responsive to current passing through the circuit breaker.

Another object of the invention is to provide a new and novel arrangement wherein the entire operating mechanism of a circuit breaker, including an operating spring, a winding motor for said spring, and a circuit controlling means for the circuit breaker, are mounted as an operative unit upon the lower end of an insulating bushing and immersed in an insulating fluid.

With the increasing use of electrical energy for domestic and industrial purposes in rural districts, it has become more and more important that protective means be provided for these transmission lines that will protect the power circuit against overloads and other abnormal conditions and, at the same time, provide, as nearly as possible, an uninterrupted service for these customers. Line troubles in the circuits supplying such users generally occur more frequently than on the main transmission lines, but in the majority of cases these faults are of short duration. When these faults occur, the service restorer is adapted to first interrupt, and subsequently, reclose the circuit and if the fault is overcome by this operation, the service restorer will remain in its circuit restored position. On the other hand, if the fault is not removed, the service restorer will continue to open and reclose the circuit until its operating spring has run down to a point where the reclosing operations are stopped with the service restorer in its open circuit position. Under these conditions, it often happens that the fault is removed from the line circuit prior to the final opening of the circuit breaker contacts and it is, therefore, a further object of the invention to provide an arrangement by which the operating spring of the service restorer may be immediately rewound so as to render the service restorer capable of performing a further series of circuit restoring operations in the event of the occurrence of a second and later fault or overload upon the circuit controlled thereby.

Other objects and advantages of the invention will be in part evident to those skilled in the art to which this invention appertains as the description thereof proceeds, and in part pointed out hereinafter in connection with the accompanying drawings, wherein there is shown by way of illustration and not of limitation, a preferred embodiment of the invention.

Figure 5:
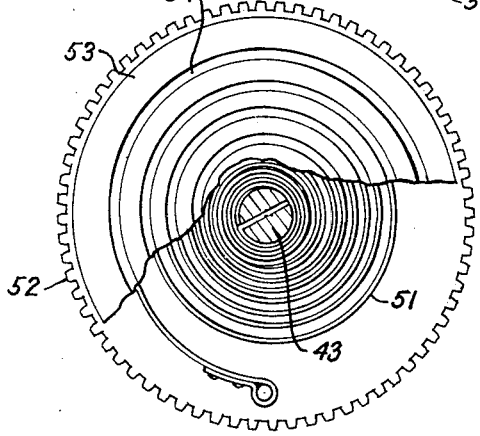

In the drawings, wherein like numerals refer to like parts throughout the several views:

Figure 1 is a front elevation of a single pole service restorer constructed and arranged to operate in accordance with the present invention and with a portion broken away to disclose details of construction, Figures 2 and 3 are diagrammatic circuits showing alternative circuit arrangements for the coils of the spring winding motor, Figure 4 is an enlarged fragmentary rear view of the device of Figure 1 showing the operating mechanism contemplated by the present invention, Figure 5 is a view showing the operating spring of the mechanism illustrated in Figure 4, Figure 6 is a fragmentary sectional view taken along line VI—VI of Figure 4 and showing a further detail of the mechanism, Figure 7 is a fragmentary side elevation of the mechanism illustrated in Figure 4, looking to the right, Figure 8 is a fragmentary view showing a portion of the mechanism of Figure 4 with the parts in a different operating position, and Figure 9 is a perspective view showing a detail of construction.

As shown in Figure 1 of the drawings, the entire circuit breaker and its operating mechanism is adapted to be secured as a unit upon an elevated support, such as a crossarm 10 of a pole or other suitable supporting structure, by means of a clamping plate 11 and bolts 12 that are adjustably carried by a slotted plate 13 carried by a cover 14 which supports two insulators 15 and 16 that are preferably of the bushing type. The insulator 15 has a line terminal 17 at its outer end and at its lower end it projects downwardly through the cover 14 where it supports a suitable stationary contact 18 that is enclosed in an arc extinguishing chamber 19. Likewise, the insulator 16 carries a line terminal 20 at its upper end and projects downwardly through the cover member 14 where it carries a suitable supporting frame 21 upon which a contact 22 is movably mounted so as to cooperate with the stationary contact 18 carried by the insulator 15. In addition to the movable contact 22, the supporting frame 21 also serves as a support for a complete operating mechanism, designated by the numeral 23, that operates the movable contact member 22 into and out of engagement with the cooperating stationary contact 18 at the lower end of the insulator bushing 15. These insulator bushings 15 and 16 are shown as secured intermediate their ends to the cover member 14 by means of suitable clamps 24 and they each include centrally disposed conductors that respectively provide for a connection between the line terminals 17 and 20 and the contacts 18 and 22 at the lower ends thereof. In this figure of the drawings the insulators 15 and 16 are also shown as having arcing horns 25 disposed adjacent their outwardly extending portions. As here shown, the cover member 14 also carries an enclosure forming tank 26 that is adapted to carry an insulating oil or other arc extinguishing fluid 27 into which the stationary contact 18 with its arc extinguishing chamber 19 and the supporting frame 21 with the movable contact 22 and its operating mechanism 23 are adapted to be completely submerged. The tank 26 projects upwardly into the cover member 14 and has a sight gauge 28 through which the level of the oil therein may be observed. At this point it will be noted that the cover member 14 also provides a support for a manually operable lever means 29 by means of which the operating mechanism 23 may be manually controlled, as explained in my copending application.

As has also been pointed out in my above identified copending application, the insulator bushing 16 carries a central conductor 30 that extends therethrough from the line terminal 20 to a point at its lower end where it is secured to a conducting plate 31 that is disposed in a plane transverse to the axis of the insulator bushing 16 and upon which the supporting frame 21 is mounted in insulated relation by means of insulating pads and bushings 32 through which bolts 33 pass. At this point it will be noted that the supporting frame 21 also carries a magnetic field structure 34 that has two coil windings 35 that are adapted to be connected in the circuit between the terminal 20 at the outer end of the bushing 16 and the movable contact 22. For this purpose the supporting frame 21 also carries a suitable terminal block 36 which, as is more clearly shown in Figures 2 and 3 of the drawings is provided with a plurality of terminals that are adapted to be bridged by suitable jumpers 37 and 38 to provide for either a series or parallel connection of the coil windings 35 in the circuit. As shown in these latter figures of the drawings, the circuit is completed from the line terminal 20 through the conductor 30 to the conducting plate 31 and by way of a connection 39 to one of the terminals of the terminal block 36 and from the terminal block 36 through the coil windings 35, either in parallel or in series, to the movable contact 22 by means of a flexible jumper 40.

As explained in my copending application, the movable contact member 22 is pivotally mounted at its end to the upper part of the supporting frame 21, and intermediate its ends this contact member 22 carries a link 41 that connects with a crank arm 42 that is mounted upon a shaft 43 which is adapted to be moved through a series of complete revolutions by an energy storing clock spring, as will hereinafter appear. The outer end of the crank arm 42 engages a movable abutment forming lever 44 when the movable contact 22 is in its circuit closed position, as here illustrated. This movable abutment forming lever 44 is shown as pivoted upon a stud 45 intermediate its ends, and at its upper end it connects with a controlling toggle mechanism 46. Associated with the field structure 34 there is a pivotally mounted armature 47 that is adapted to be attracted and moved upwardly when the current flowing through the coil windings 35 reaches a predetermined value; as for example, an overload current condition. Attached to the pivotally mounted armature 47 there is a slotted link 48 which connects with the toggle mechanism 46, and at its outer end the pivotally mounted armature 47 is connected to a spring 49 the tension of which may be varied to determine the value of current at which the pivotally mounted armature 47 will operate. When this pivotally mounted armature 47 is attracted by the magnetic field structure 34, as is understood in the art, the slotted link 48 will be carried upwardly a distance sufficient to collapse the toggle mechanism 46. This collapse of the toggle mechanism 46 will permit the movable abutment forming lever 44 to move in a clockwise direction about the stud 45 and, as a result, the outer end of the crank arm 42 will become disengaged and thus permit the crank arm 42 to rotate through an arc of its path of movement sufficient to effect a disengagement of the movable contact member 22 from the cooperating stationary contact 18 and thus open the circuit. From the preceding description, it will be understood that the described mechanism, including the crank arm 42, the movable abutment forming lever 44, its controlling toggle mechanism 46 and the pivotally mounted armature 47, are all mounted upon one side of the supporting frame 21, and that the shaft 43 projects through to the other side of the supporting frame 21 where it is adapted to be driven by an energy storing spring that is maintained in a wound condition in a manner and by means which is the subject matter of the present application. At this point it should also be stated that the arrangement here shown also contemplates a second movable abutment (not shown) that is adapted to be engaged by the crank arm 42 when the movable contact 22 is in its circuit open position, as is fully described in my copending application. These elements may, for the purpose of this description, be considered as constituting the circuit breaker controlling mechanism of the present invention.

Reference is now made to Figures 4 and 5 of the drawings for a detailed description of the power supplying and operating mechanism of the present invention which, as will now appear, comprises an energy storing spring and a novel arrangement and type of electromagnetic motor by means of which the energy storing spring is maintained in a wound and operative condition in an automatic manner.

As is more clearly shown in Figure 4 of the drawings, the supporting frame 21 is provided with a downwardly extending and vertically disposed plate-like portion 50 through which the shaft 43 extends. As shown in Figure 5, the shaft 43 is connected to the inner end of an energy storing and operating spring 51 of the clock spring type, the outer end of which is connected to a suitable supporting housing comprising an inner gear tooth carrying plate 52 and an outwardly spaced plate 53 in which there is cut a spiral groove 54, the purpose of which will be described hereinafter. The energy storing clock spring 51 is so disposed within the housing formed by the plates 52 and 53 that it will impart a counter-clockwise rotation to the shaft 43, as viewed in this figure of the drawings, when the crank arm 42 is released by the movable abutment forming lever 44. To provide a means by which the energy storing spring 51 may be manually wound, there is shown an engaging dog 55 that is held in engagement with the gear teeth upon the plate 52 by a link 56 that is adapted to be reciprocated vertically by an insulating rod 57 which connects with the lever 29, as is described in my copending application. As here illustrated, the energy storing spring 51 is adapted to be normally maintained in a wound condition by an electromagnetic motor means which comprises a vibratory armature 58 that is positioned and supported adjacent the magnetic field structure 34 by means of a flexible supporting member 59 which is secured at its fixed end to a boss 60 formed upon the supporting frame 21. At its free end the flexible supporting member 59 is turned down to provide a depending end 61 that carries a disc clutching device 62 that forms a uni-directional driving connection between the vibratory armature 58 and a rotatable disc 63 which is suitably journaled upon the supporting frame 21. Associated with the vibratory armature 58 the flexible supporting member 59 also carries an outwardly extending bracket 64 which engages a compression spring 65 that exerts an outward bias upon the vibratory armature 58 and thus insures a positive outward force exerting movement of the vibratory armature 58 when the magnetic field coil windings 35 are excited by an alternating electric current. The outwardly extending bracket 64 is shown as operable between an adjustable stop nut 66 and the compression spring 65 is shown as held in position by means of an enlarged head 67 carried by a threaded stud 68 which is adjustably threaded upon the supporting frame 21. With this arrangement it will be seen that when the magnetic field structure 34 is excited with an alternating current, the vibratory armature 58 will be attracted and released during each alternation of the magnetic field exciting current so as to periodically compress and release the compression spring 65 and, as a result, the disc clutching device 62 will vibrate in a vertical path substantially tangent to the periphery of the disc 63. In this arrangement, the disc clutching device 62 is so designed and arranged that it will grip and exert a downward driving force upon the disc 63 under the influence of the compression spring 65 upon each electromagnetic release of the vibratory armature 58. In other words, when the vibratory armature 58 is attracted by the magnetic field structure 34, it will compress the compression spring 65 and when released, the compression spring 65 will transmit its stored energy to the disc clutching device 62 and thus cause the disc 63 to rotate in a counter-clockwise direction, as viewed in this figure of the drawings. Connected to and mounted upon the shaft of the disc 63, there is a small pinion that meshes with a relatively larger gear 69 which in turn drives a second pinion 70 that engages the gear teeth previously described as carried by the plate 52 which forms a part of the rotatable support to which the outer end of the energy storing spring 51 is connected.

While the clutching device 62 may take many different forms, it is shown in Figure 6 of the drawings as having rollers or balls 71 that are disposed at opposite sides of the disc 63 and cooperate with oppositely inclined surfaces formed upon two oppositely disposed members 72 that are secured in properly spaced relation upon the depending end 61 of the flexible supporting member 59. This provides a wedge-like gripping action between the balls 71 and the disc 63 as the clutching device 62 is moved in a downward direction and which releases when the clutching device 62 is moved in an upward direction. In this particular device the power stroke exerting characteristic of the compression spring 65 and the gear reduction between the rotatably driven disc 63 and the energy storing clock spring 51 are so proportioned that under normal operating conditions a winding torque will be exerted upon the energy storing spring 51 which will be great enough to overcome any back torque that might be exerted by the energy storing spring 51. As a result, the energy storing spring 51 will be maintained in a wound condition with sufficient stored energy to produce at least three complete reclosing and a final opening operation of the circuit breaker. In order to prevent any further operation of the energy storing spring 51 after the circuit breaker has completed its final opening operation in any series, there is provided a stop engaging means 73 that moves radially in a channel-like guide 74 which is rotatably carried by the shaft 43. The channel-like guide 74 rotates relative to the plate 53 and the stop engaging means 73 has a projecting pin 75 that engages the spiral groove 54 previously described as formed in the plate 53 which, in conjunction with the plate 52, forms a rotatable support to which the outer end of the energy storing spring 51 is connected. When the energy storing spring 51 unwinds, as when it operates upon the shaft 43 to move the contact 22 of the circuit breaker through its operating positions with respect to the stationary contact 18, the pin 75 will follow the spiral groove 54 as the channel-like guide 74 moves relative to the plate 53 and, as a result, the stop engaging means 73 will move outward radially and engage a stationary stop 76, shown in section in Figure 4 of the drawings as located immediately above and substantially on the vertical center line of the operating shaft 43. This stationary stop 76, as shown in Figure 7 of the drawings, is carried by and projects inwardly from a cover plate 77 that has been removed from the device as illustrated in Figure 4. As shown in this latter figure of the drawings, the cover plate 77 is secured upon outwardly projecting pedestals 78, 79 and 80 that are carried by the plate-like portion 50 of the supporting frame 21. This cover plate 77, in addition to providing a support for the stop 76, also provides journal-like supports for the outer ends of shafts upon which the shaft 43, the rotatable disc 63, the gears 52, 69, 70, and the operating levers, to be hereinafter described, are mounted. This stationary stop 76 is so positioned that it will be engaged by the stop engaging means 73 and prevent further rotation of the shaft 43 when the energy storing spring 51 approaches its rundown condition, as after it has operated the shaft 43 through a predetermined number of circuit breaker opening and reclosing operations, and at a time when the movable contact member 22 of the circuit breaker is in its final open circuit position. The purpose of this arrangement, as will be understood from the above, is to prevent any reclosing operation of the circuit breaker contact 22 after the energy storing spring 51 has run down to a point where it may not have sufficient stored energy to complete a subsequent and final circuit opening operation of the circuit breaker. If it should happen that the fault is not removed from the circuit by these opening and reclosing operations of the circuit breaker, and the energy storing spring 51 becomes rundown, as indicated above, it will then be rewound manually by means of the lever arm 29 after the fault-causing condition upon the circuit has been repaired.

As is more clearly shown in Figure 8 of the drawings, the stop engaging means 73 is, in addition to the last above function, also arranged and adapted so that when the energy storing spring 51 approaches its fully wound condition, it will be moved in an opposite radial direction and bring its opposite end 81 into cooperating relation with a lever 82 that is pivotally mounted upon a shaft 83 and which, as will now be described, operates in a novel manner to prevent any objectionable chattering of the vibratory armature 58 when the energy storing spring 51 is fully wound, as will be the case when the contact member 22 of the circuit breaker is in its normal closed circuit position with respect to its cooperating stationary contact 18. This lever 82, as is more clearly shown in Figure 9, is of what may be termed an offset bell-crank design. At its outer end the lever 82 has a foot 84 which extends laterally into the path of the end portion 81 of the stop engaging means 73, and at its pivoted end it extends inwardly through a web 85 and is connected to an arm 86 which moves therewith. At the outer end of the arm 86 there is a second laterally extending foot 87 and an upwardly extending spring centering boss 88. The laterally extending foot 87 upon the arm 86 is adapted, when moved upwardly, as shown in this latter figure of the drawings, to engage and release a latching member 89 that is pivotally mounted upon an adjacent stud 90 and which normally serves to hold a vibratory armature engaging lever 91 in an inoperative position. As shown, the lever 91 is pivoted upon the supporting frame 21 by means of a stud 92, and intermediate its ends this lever 91 has an upwardly extending pad 93 that is adapted to be brought into engagement with the flexible supporting member 59 upon which the vibratory armature 58 is mounted. At its outer end the lever 91 also has an offset extension 94 with which the latching member 89 cooperates. This lever 91 is biased downwardly by a tension spring 95 and when released by the latching member 89, it is adapted to be moved upwardly by a compression spring 96 that is carried by the spring centering boss 88 upon the arm 86. The lever arm 91 also has a similar spring centering boss 97 which serves to hold the compression spring 96 in a position where it will be compressed when the lever 82 is operated by the end 81 of the stop engaging means 73. Cooperating with the lever 91 there is also an eccentrically mounted stop 98 that is adjustable to limit its downward movement with respect to the latching member 89.

From the above description it will be seen that when the circuit breaker is connected in an alternating current power line, and the movable contact 22 is in its closed circuit position with respect to the stationary contact 18, the line current will flow through the coil windings 35 of the magnetic field structure 34. This alternating current passing through the coil windings 35 will set up a pulsating magnetic field in the magnetic field structure 34 that will cause the vibratory armature 58 to vibrate with respect thereto. As a result, the compression spring 65 will be periodically compressed and released and the clutching device 62 will be moved with a vibratory movement and impart a step-by-step rotation to the rotatable disc 63. As the rotatable disc 63 is thus rotated, its movement will be transmitted through the gears 69 and 70 to the gear tooth carrying plate 52 which supports the energy storing clock spring 51, and the latter spring will be subjected to a spring winding operation. If it is now assumed that the movable abutment forming lever 44 is moved out of interfering relation with the crank arm 42 carried by the operating shaft 43, as in the event of a fault upon the power line, it will be seen that the energy storing spring 51 will be free to impart a circuit opening operation of the operating shaft 43 and move the movable contact 22 out of contact with the stationary contact 18 and thus open the circuit. When this occurs, the crank arm 42, as suggested above and as is more fully described in my copending application, will be held temporarily with the movable contact 22 in its open circuit position, after which the crank arm 42 will be released to permit a further operation of the operating shaft 43 by the energy storing spring 51 which again will bring the movable contact 22 into cooperating relation with the stationary contact 18 to thus reclose the circuit breaker and restore the circuit. Should it now happen that the fault has been removed, and the movable contact 22 remains in its circuit closed position, the magnetic field structure 34 will again become excited by the current passing through the coil windings 35 and, as a result, the vibratory armature 58 will operate as above to rewind the energy storing spring and restore it to its original wound condition. As the energy storing spring 51 unwinds, it will turn the operating shaft 43 in a counter-clockwise direction, as viewed in Figures 4, 5 and 8 of the drawings, and at the same time the plates 52 and 53, to which the outer end of the energy storing spring 51 is connected, will remain relatively stationary. This rotation of the operating shaft 43 will also cause the channel-like guide 74, which carries the stop engaging means 73, to turn relative to the plate 53. As this occurs, the pin 75 upon the stop engaging means 73 will follow the spiral groove 54 formed in the surface of the plate 53 and the stop engaging means 73 will be moved outwardly in a radial direction with respect to the axis of the operating shaft 43 until its end has been projected outwardly to a point where it will interfere with the stationary stop 76 which, as described above, is arranged in its path. When this occurs, the energy storing spring 51 will operate the circuit breaker through a series of complete circuit opening and restoring operations and also a final circuit opening operation. Such an operation of the circuit breaker will normally only occur in the event of a prolonged fault upon the power line and, therefore, with the final operation of the movable contact member into its circuit open position, no further current will flow through the coil windings 35 of the magnetic field structure 34 and, as a result, the circuit breaker will be rendered inoperative until the fault upon the power line has been repaired and the energy storing spring 51 has been manually rewound sufficiently to complete at least one circuit restoring operation of the operating shaft 43. If it is now assumed that the energy storing spring 51 is not fully wound and that the movable contact 22 is in its closed circuit position, current will flow through the coil windings 35 and the vibratory armature 58 will operate upon the compression spring 65 and thus cause the clutching device 62 to impart rotation to the rotatable disc 63. Under these conditions, the crank arm 42 will be held stationary by the movable abutment forming lever 44 and, as a result, the shaft 43 and the channel-like guide 74 with the stop engaging means 73 will be held stationary relative to the plate 53 which will now rotate with the gear tooth carrying plate 52 as the latter is rotated by the rotatable disc 63 to wind the energy storing spring 51. As a result of this relative movement between the channel-like guide 74 and the plate 53, the pin 75 upon the stop engaging means 73 will cause the stop engaging means 73 to move radially in a direction opposite to that previously described and thus bring its opposite end 81 into operative engagement with the lever 82. At this point further radial movement of the stop engaging means 73 will cause the lever 82 to be rotated counter-clockwise until the extending foot 87 upon its arm 86 has operated to move the latch 89 out of restraining relation with the offset extension 94 at the end of the lever 91. During this movement of the lever 82, and prior to an unlatching of the lever 91, it will be seen that the compression spring 96 will be placed under compression and, consequently, when the lever 91 is released by the latch 89, the compression spring 96 will immediately operate and exert an upwardly directed force upon the lever 91 sufficient to overcome the action of the spring 65 and move the vibratory armature 58 into contact and non-chattering relation with the pole faces of the magnetic field structure 34. The advantage of this feature, as stated above, is that it prevents the possibility of any chattering or hum being produced by the vibratory armature 58 after the energy storing spring 51 has been fully wound.

While I have described preferred embodiments of my invention in accordance with the patent statutes, I desire it to be understood that I do not wish to be limited to the particular embodiments disclosed herein inasmuch as it will be obvious, particularly to persons skilled in the art, that many changes and modifications may be made in the particular structures disclosed herein without departing from the broad spirit and scope of my invention. It is also desired that my invention be interpreted as broadly as possible and that it be limited only by what is expressly stated in the following claims.

Having thus described my invention, what I claim and desire to secure by Letters Patent is:

1. In an automatic service restoring circuit breaker of the character described, the combination of cooperating circuit controlling contacts, a shaft adapted and arranged to operate said circuit controlling contacts through a series of circuit controlling operations, an energy storing spring adapted to drive said shaft and move said circuit controlling contacts through a series of circuit opening and circuit restoring operations, means for controlling the operations of said shaft in response to load conditions on the circuit through said circuit breaker, an electric motor connected in series circuit with said circuit controlling contacts and energized by the current passing through said circuit breaker, and a driving connection between said electric motor and said energy storing spring, whereby said electric motor will maintain said energy storing spring in a wound condition when the contacts of said circuit breaker are in their closed circuit position.

2. In an automatic service restoring circuit breaker of the character described, the combination of cooperating circuit controlling contacts, a shaft adapted and arranged to operate said circuit controlling contacts through a series of circuit controlling operations, an energy storing spring adapted to rotate said shaft through a series of fractional revolutions and operate said circuit controlling contacts through a series of circuit opening and circuit restoring positions, electroresponsive means for controlling the operations of said shaft in response to load conditions on the circuit through said circuit breaker, an electric motor connected in series circuit with said circuit controlling contacts and energized by the current passing through said circuit breaker for winding said energy storing spring, and a one-way driving connection between said electric motor and said energy storing spring, whereby said electric motor will operate to maintain said energy storing spring in a predetermined wound condition when the contacts of said circuit breaker are in their closed circuit position.

3. In an automatic service restoring circuit breaker of the character described, the combination of cooperating circuit controlling contacts, a shaft adapted to operate said circuit controlling contacts through a series of circuit controlling operations, an energy storing spring adapted to rotate said shaft through a series of fractional revolutions and move said circuit controlling contacts through a series of circuit opening and circuit restoring operations, a latching means for controlling the rotation of said shaft, electroresponsive means for controlling said latching means in response to load conditions on the circuit through said circuit breaker, and a unidirectional torque exerting motor connected in series circuit with said circuit controlling contacts and energized by the current passing through said circuit breaker arranged and adapted to maintain said energy storing spring in a predetermined wound condition when the contacts of said circuit breaker are in their closed circuit position.

4. In an automatic service restoring circuit breaker of the character described, the combination of cooperating circuit controlling contacts, an operating shaft adapted and arranged to move said circuit controlling contacts through a series of circuit opening and restoring operations, an energy storing torsion spring connected at one end to said operating shaft and adapted to rotate said shaft through a series of fractional revolutions to move said circuit controlling contacts through a series of circuit opening and circuit restoring operations, electroresponsive latch means for controlling the operations of said shaft in response to load conditions on the circuit through said circuit breaker, an electric motor connected in series circuit with said circuit controlling contacts and continuously energized by the current passing through said circuit breaker when said circuit controlling contacts are in their closed circuit position, and a driving connection between said electric motor and the other end of said energy storing torsion spring, whereby said electric motor will operate to maintain said energy storing torsion spring in a predetermined wound condition when the contacts of said circuit breaker are in their closed circuit position.

5. In an operating mechanism for an automatic service restoring circuit breaker having cooperating contacts adapted to move through a series of circuit controlling positions in the event of an abnormal condition in a power line, the combination of an operating shaft for controlling the movements of said contacts, a torsion spring connected at one end in driving relation with said operating shaft and connected at its other end to a member rotatably mounted upon the axis of said operating shaft, a magnetic field producing structure having an exciting winding connected in series with the circuit through the contacts of said circuit breaker, a vibratible armature mounted in cooperating relation with said magnetic field producing structure, a rotatable disc mounted adjacent said vibratible armature and adapted to be driven with a step-by-step uni-directional movement as said vibratible armature is vibrated under the influence of said magnetic field producing structure, and a driving connection between said rotatable disc and the member to which said other end of the torsion spring is connected, whereby said torsion spring will be wound and maintained in an energy storing condition when the circuit breaker contacts are in their closed circuit position.

6. In an operating mechanism for an automatic service restoring circuit breaker having cooperating contacts adapted to move through a series of circuit controlling positions in the event of an abnormal condition in a power line, the combination of an operating shaft for controlling the movements of said contacts, a clock spring connected at one end in driving relation with said operating shaft and connected at its other end to an enclosing housing rotatably mounted upon the axis of said operating shaft, a periodic magnetic field producing structure having an exciting winding connected in series with the circuit through the contacts of said circuit breaker, a vibratible armature mounted in cooperating relation with said periodic magnetic field producing structure, a rotatable disc mounted adjacent said vibratible armature, means carried by said vibratible armature engaging said rotatable disc and adapted to impart a step-by-step uni-directional movement to said rotatable disc as said vibratible armature is vibrated under the influence of said periodic magnetic field producing structure, and a driving connection between said rotatable disc and said clock spring housing, whereby said clock spring will be wound and held in an energy storing condition by said rotatable disc when the circuit breaker contacts are in their closed circuit position.

7. In an automatically operating service restoring circuit breaker of the character described, the combination of an operating shaft adapted to be rotated in a uni-directional manner to control the circuit breaker, an energy storing spring connected at one end in driving relation with said operating shaft, a rotatable disc connected in winding relation with the other end of said energy storing spring, a vibratible armature mounted adjacent said rotatable disc, a clutch means carried by said vibratible armature engaging said rotatable disc adjacent its periphery and forming a one-way driving connection between said vibratible armature and said rotatable disc, a compression spring means operating to move said vibratible armature and said clutch means in a spring winding direction, and a magnetic field structure having an alternating current winding connected in series with the line circuit through the circuit breaker adapted to attract said armature and periodically compress said compression spring when the circuit breaker is in its circuit closed position, whereby upon each alternation of the current flowing through said winding said compression spring will exert a winding force upon said energy storing spring.

8. In an automatically operating service restoring circuit breaker of the character described, the combination of an operating shaft adapted to be rotated in a uni-directional manner to control the circuit breaker, an energy storing spring connected at one end in driving relation with said operating shaft, an electric motor for winding said energy storing spring having a disc-like member connected in winding relation with the other end of said energy storing spring, a vibratible armature mounted adjacent said disc-like member, a clutch means carried by said vibratible armature engaging said disc-like member adjacent its periphery and forming a one-way driving connection between said vibratible armature and said disc-like member, a compression spring means operating upon said vibratible armature to move said clutch means in an energy storing spring winding direction, and a magnetic field structure having an alternating current winding connected in series with the line circuit through the circuit breaker adapted when excited to influence said vibratible armature to periodically compress and release said compression spring, whereby said energy storing spring will be wound and held in an energy storing condition when the circuit breaker is in its circuit closed position.

9. In a mechanically operated and electrically controlled service restoring circuit breaker of the character described, the combination of cooperating circuit controlling contacts, an operating shaft for imparting relative circuit opening and circuit restoring movements to said cooperating contacts, electromagnetically responsive means normally operating to prevent rotation of said operating shaft when said cooperating contacts are in their closed circuit position, an energy storing spring adapted and arranged to rotate said operating shaft through a series of circuit controlling operations, motor means for winding said energy storing spring, and a single magnetic field producing structure having a winding connected in series circuit with the contacts of said circuit breaker providing a magnetic field for both said motor means and said electromagnetically responsive means when said cooperating circuit controlling contacts are in their circuit closed position, whereby said motor means will operate to maintain said energy storing spring in a wound condition under normal current conditions and said electromagnetically responsive means will operate to release said operating shaft and permit said energy storing spring to move said cooperating contacts into a circuit open position under abnormal current conditions.

10. The combination set forth in claim 9, wherein the entire operating mechanism, including the operating shaft, the electromagnetically responsive means, the energy storing spring, the motor means, the magnetic field producing structure, and at least one of the cooperating circuit controlling contacts are mounted as an operative unit upon a single insulated supporting structure.

11. The combination set forth in claim 9, wherein the entire operating mechanism, including the operating shaft, the electromagnetically responsive means, the energy storing spring, the motor means, the magnetic field producing structure, and at least one of the cooperating circuit controlling contacts are mounted as an operative unit upon the lower end of a power line terminal carrying and insulating bushing.

12. The combination set forth in claim 9, wherein the entire operating mechanism, including the operating shaft, the electromagnetically responsive means, the energy storing spring, the motor means, the magnetic field producing structure, and at least one of the cooperating circuit controlling contacts are mounted as an operative unit upon a single insulated supporting structure and submerged in its entirety in an insulating fluid.

13. In an automatic service restorer of the character described, the combination of a supporting frame, a movable contact member adapted to engage a cooperating stationary contact and establish a circuit therethrough, energy storing spring means adapted to move said movable contact member into and out of engagement with said cooperating stationary contact, a holding means adapted to retain said movable contact member in its closed circuit position and against the action of said energy storing spring means, an electric motor means for maintaining said energy storing spring means in a wound condition, a magnetic field producing winding energized by current flowing through said movable contact member adapted under normal current conditions to provide an electromagnetic field for said electric motor means, and a uni-directional driving connection between said electric motor means and said energy storing spring means, whereby said energy storing spring means will be prevented from unwinding through said driving connection when said magnetic field producing winding is deenergized by a circuit opening movement of said movable contact member.

14. In an operating mechanism for an automatic service restoring circuit breaker of the character described, the combination of an operating shaft adapted to be rotated in a uni-directional manner to control the circuit breaker, an energy storing spring connected at one end in driving relation with said operating shaft, a rotatable disc connected in winding relation with the other end of said energy storing spring, a vibratible armature mounted adjacent said rotatable disc, means forming a one-way driving connection between said rotatable disc and said vibratible armature, a magnetic field structure having an exciting winding adapted when energized by an alternating current to impart a vibratory movement to said vibratible armature, whereby an energy storing spring winding movement will be imparted to said rotatable disc, and means responsive to a fully wound condition of said energy storing spring adapted to prevent vibration of and hold said vibratible armature in non-chattering relation with said magnetic field structure.

15. In an operating mechanism for an automatic service restoring circuit breaker of the character described, the combination of an operating shaft adapted to be rotated in a uni-directional manner to control the circuit breaker, an energy storing spring connected at one end in driving relation with said operating shaft, a rotatable disc connected in winding relation with the other end of said energy storing spring, a vibratible armature mounted adjacent said rotatable disc, means forming a one-way driving connection between said rotatable disc and said vibratible armature, a magnetic field structure having pole faces and an exciting winding adapted when energized by an alternating current to impart a vibratory movement to said vibratible armature, whereby an energy storing spring winding movement will be imparted to said rotatable disc, normally inactive lever means mounted adjacent the vibratible armature and adapted when operating to hold said vibratible armature in non-chattering relation with the pole faces of said magnetic field structure, and means responsive to the wound condition of said energy storing spring adapted to render said lever means operative when the energy storing spring is fully wound.

16. In an operating mechanism for an automatic service restoring circuit breaker of the character described, the combination of an operating shaft adapted to be rotated in a uni-directional manner to control the circuit breaker, an energy storing spring connected at one end in driving relation with said operating shaft, a rotatable disc connected in winding relation with the other end of said energy storing spring, a vibratible armature mounted adjacent said rotatable disc, means forming a one-way driving connection between said rotatable disc and said vibratible armature, a compression spring means operating to move said vibratible armature in a rotatable disc driving direction, a magnetic field structure having an exciting winding adapted when energized by an alternating current to impart a vibratory movement to said vibratible armature and periodically compress and release said compression spring, whereby an energy storing spring winding movement will be imparted to said rotatable disc, and means responsive to a fully wound condition of said energy storing spring adapted to prevent the operation of said compression spring and hold said vibratible armature in non-chattering relation with said magnetic field structure.

JOSEPH S. THOMPSON.